(12) United States Patent
Shimomura et al.

(10) Patent No.: US 12,337,856 B2
(45) Date of Patent: Jun. 24, 2025

(54) VEHICLE CONTROL DEVICE

(71) Applicant: TOYOTA JIDOSHA KABUSHIKI KAISHA, Toyota (JP)

(72) Inventors: Ichiya Shimomura, Nagoya (JP); Shinya Otani, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 371 days.

(21) Appl. No.: 17/965,933

(22) Filed: Oct. 14, 2022

(65) Prior Publication Data

US 2023/0174081 A1 Jun. 8, 2023

(30) Foreign Application Priority Data

Dec. 6, 2021 (JP) ................................. 2021-197457

(51) Int. Cl.
*B60W 30/06* (2006.01)
*B60W 50/02* (2012.01)
*B60W 50/029* (2012.01)
*B60W 50/14* (2020.01)

(52) U.S. Cl.
CPC .......... *B60W 50/029* (2013.01); *B60W 30/06* (2013.01); *B60W 50/0205* (2013.01); *B60W 50/14* (2013.01); *B60W 2050/0292* (2013.01); *B60W 2050/146* (2013.01)

(58) Field of Classification Search
CPC ............... B60W 50/029; B60W 30/06; B60W 50/0205; B60W 50/14; B60W 2050/0292; B62D 15/0285
See application file for complete search history.

(56) References Cited

U.S. PATENT DOCUMENTS

| | | | |
|---|---|---|---|
| 9,580,080 B1* | 2/2017 | Letwin | B60W 50/082 |
| 10,252,726 B2* | 4/2019 | Emura | B60K 35/00 |
| 10,338,598 B2* | 7/2019 | Altinger | G05D 1/0246 |
| 10,585,431 B2* | 3/2020 | Golgiri | B62D 15/0285 |
| 10,684,773 B2* | 6/2020 | Lavoie | G06F 3/017 |
| 10,732,622 B2* | 8/2020 | Bettger | B62D 1/00 |
| 10,807,641 B2* | 10/2020 | Gehin | G06V 20/58 |
| 10,831,187 B2* | 11/2020 | Bourassi | B60W 50/14 |

(Continued)

FOREIGN PATENT DOCUMENTS

| | | | |
|---|---|---|---|
| JP | 2015-101225 A | | 6/2015 |
| WO | WO200004477 | * | 3/2021 |

*Primary Examiner* — Dino Kujundzic
(74) *Attorney, Agent, or Firm* — Sughrue Mion, PLLC

(57) ABSTRACT

A vehicle control device includes: a communication unit that communicates with a mobile terminal; and a control unit that executes automatic parking control for causing the vehicle to travel to a target parking position and parking the vehicle in the target parking position in response to a signal transmitted by the mobile terminal. The control unit execute: first abnormality vehicle stop control for decelerating the vehicle to stop the vehicle and changing an ignition from an on state to an off state when the vehicle stops, in a case where a general abnormality occurs during execution of the automatic parking control; and second abnormality vehicle stop control for decelerating the vehicle to stop the vehicle and prohibiting the ignition from being changed to the off state when the vehicle stops, in a case where a specific abnormality occurs in the vehicle during the execution of the automatic parking control.

5 Claims, 9 Drawing Sheets

(56) References Cited

U.S. PATENT DOCUMENTS

| | | | |
|---|---|---|---|
| 11,269,323 B2* | 3/2022 | Golsch | G08G 1/143 |
| 11,372,401 B2* | 6/2022 | Noguchi | G05D 1/0055 |
| 11,886,185 B2* | 1/2024 | Suzuki | G05D 1/0016 |
| 12,093,033 B2* | 9/2024 | Suzuki | B60W 60/001 |
| 2006/0089764 A1* | 4/2006 | Filippov | G05D 1/027 |
| | | | 701/2 |
| 2006/0089800 A1* | 4/2006 | Svendsen | G05D 1/027 |
| | | | 701/1 |
| 2008/0074247 A1* | 3/2008 | Plantamura | B60W 50/0205 |
| | | | 340/691.3 |
| 2008/0252466 A1* | 10/2008 | Yopp | B60K 28/066 |
| | | | 340/576 |
| 2013/0252785 A1* | 9/2013 | Kinoshita | B60W 10/182 |
| | | | 477/97 |
| 2015/0032323 A1* | 1/2015 | Nijakowski | B60W 30/06 |
| | | | 701/23 |
| 2015/0035463 A1* | 2/2015 | Kimura | F16D 63/002 |
| | | | 318/400.21 |
| 2015/0127208 A1* | 5/2015 | Jecker | B62D 15/0285 |
| | | | 701/23 |
| 2015/0283998 A1* | 10/2015 | Lind | B60W 30/00 |
| | | | 701/23 |
| 2015/0375741 A1* | 12/2015 | Kiriya | G06V 40/28 |
| | | | 701/2 |
| 2017/0144654 A1* | 5/2017 | Sham | G08G 1/148 |
| 2017/0144655 A1* | 5/2017 | Blott | B62D 15/0285 |
| 2019/0001989 A1* | 1/2019 | Schoenfeld | G06F 11/1441 |
| 2019/0061774 A1* | 2/2019 | Nordbruch | B60W 50/02 |
| 2020/0130676 A1* | 4/2020 | Smid | B60W 30/06 |
| 2020/0209848 A1* | 7/2020 | Mercep | G05D 1/0088 |
| 2020/0209853 A1* | 7/2020 | Leach | G01S 7/4972 |
| 2020/0239073 A1* | 7/2020 | Watanabe | B60Q 9/005 |
| 2020/0324791 A1* | 10/2020 | Ueno | G05D 1/0088 |
| 2020/0371516 A1* | 11/2020 | Walossek | G05D 1/0027 |
| 2021/0086757 A1* | 3/2021 | Sugano | B60W 30/06 |
| 2021/0162988 A1* | 6/2021 | Kang | B62D 15/0285 |
| 2021/0253134 A1* | 8/2021 | Heimberger | B60W 50/10 |
| 2021/0284137 A1* | 9/2021 | Nakagawa | G07C 5/0808 |
| 2021/0284181 A1* | 9/2021 | Song | G07C 5/008 |
| 2022/0289216 A1* | 9/2022 | Kamiyamaguchi | B60W 50/14 |
| 2022/0355791 A1* | 11/2022 | Hao | B62D 15/0285 |
| 2023/0039339 A1* | 2/2023 | Chen | G06F 3/017 |
| 2023/0219598 A1* | 7/2023 | Yoon | B60K 35/00 |
| | | | 701/25 |

* cited by examiner

VEHICLE CONTROL DEVICE

CROSS-REFERENCE TO RELATED APPLICATION

This application claims priority to Japanese Patent Application No. 2021-197457 filed on Dec. 6, 2021, incorporated herein by reference in its entirety.

BACKGROUND

1. Technical Field

The present disclosure relates to a vehicle control device that executes automatic parking control for causing a vehicle to travel to a preset target parking position and parking the vehicle in the target parking position in response to an operation on a mobile terminal of a user outside the vehicle.

2. Description of Related Art

Conventionally, a vehicle control device that executes automatic parking control for parking a vehicle in a target parking position in response to a remote operation has been known. For example, the vehicle control device described in Japanese Unexamined Patent Application Publication No. 2015-101225 (JP 2015-101225 A) (hereinafter referred to as a "conventional device") performs the following three controls in the automatic parking control when the vehicle reaches the target parking position.
- Change the state of a "power transmission device that transmits driving force to drive wheels" to a parked state.
- Operate an electric parking brake.
- Change an ignition of the vehicle from an on state to an off state.

SUMMARY

The present inventors have examined a vehicle control device (hereinafter referred to as an "examination device") that executes control for stopping the vehicle (abnormality vehicle stop control) when an abnormality occurs in the vehicle during execution of the automatic parking control.

In particular, the examination device decelerates the vehicle in order to stop the vehicle. Then, when the vehicle is stopped, the examination device changes the state of the power transmission device to a parked state, operates the electric parking brake, and changes the ignition to the off state.

However, there is a possibility that a specific abnormality occurs in the vehicle in which the ignition cannot be changed to the on state again after being changed to the off state. In a case where the ignition is changed to the off state by the abnormality vehicle stop control when such a specific abnormality occurs, the ignition cannot be changed to the on state again. As a result, the vehicle that cannot travel is left unattended on a road.

The present disclosure has been made to address the above-mentioned issues. That is, one of the objects of the present disclosure is to provide a vehicle control device capable of suppressing the vehicle that cannot travel from being left unattended on the road because the ignition cannot be changed to the on state when the specific abnormality occurs.

A vehicle control device according to the present disclosure (hereinafter also referred to as a "present disclosure device") includes:
a communication unit (22) that communicates with a mobile terminal (23) operated by a user outside a vehicle; and
a control unit (20, 30, 40, 50, and 60) that executes automatic parking control for causing the vehicle to travel to a predetermined target parking position and parking the vehicle in the target parking position in response to an operation signal transmitted by the mobile terminal when the user performs a predetermined operation on the mobile terminal.

The control unit is configured to:
execute first abnormality vehicle stop control for decelerating the vehicle to stop the vehicle and changing an ignition of the vehicle from an on state to an off state when the vehicle is stopped (step 306, step 308, step 310, step 715, step 725, and step 735), in a case where a general abnormality other than a specific abnormality occurs during execution of the automatic parking control (step 302, step 510 "No", and step 530); and
execute second abnormality vehicle stop control for decelerating the vehicle to stop the vehicle and prohibiting the ignition from being changed to the off state when the vehicle is stopped (step 306 and step 308 shown in FIG. 4, step 406, step 715, step 725, and step 740), in a case where the specific abnormality occurs in the vehicle during the execution of the automatic parking control (step 402, step 510 "Yes", and step 515).

The control unit is configured to preset, as the specific abnormality, an abnormality in which the ignition is not able to be changed to the on state again after the ignition is temporarily changed to the off state.

The present disclosure device executes the second abnormality vehicle stop control, and does not change the ignition to the off state even when the vehicle is stopped, in a case where the specific abnormality occurs during the execution of the automatic parking control. As a result, since the ignition is not changed to the off state, it is possible to suppress the vehicle that cannot travel because the ignition cannot be changed to the on state from being left unattended on a road.

In one aspect of the present disclosure device,
the control unit is configured to detect an abnormality related to a drive device (34a) that applies driving force to the vehicle and a lever position indicating a position of a shift lever (42a) set by a driver seated in a driver's seat of the vehicle, and preset, as the specific abnormality, an abnormality related to a shift-by-wire mechanism (42, 44, 44a, and 44b) that changes a state of a power transmission device that transmits the driving force generated by the drive device to a drive wheel of the vehicle to a state corresponding to the lever position.

When the abnormality occurs in the drive device, it is highly possible that the ignition cannot be changed to the on state again. When the abnormality occurs in the shift-by-wire mechanism, it is highly possible that the ignition cannot be changed to the on state again because the on condition described below cannot be satisfied. In this aspect, these abnormalities are preset as the specific abnormalities, and when these abnormalities occur, the ignition is maintained in the on state. This makes it possible to suppress the vehicle that cannot travel because the ignition cannot be changed to the on state from being left unattended on the road.

In the above aspect,
the control unit is configured to:
cause the shift-by-wire mechanism to change the state of the power transmission device to a parked state in which the driving force is not transmitted to the drive wheel and the drive wheel is stopped, when the vehicle reaches the target parking position, in the automatic parking control (step 222 and step 820);
change the ignition to the on state when a predetermined on condition including a condition that the state of the power transmission device is in the parked state is satisfied, and prohibit the ignition from being changed to the on state when the on condition is not satisfied, in a case where the ignition is in the off state, and an ignition switch provided in a vehicle cabin of the vehicle is operated; and
preset, as the abnormality related to the shift-by-wire mechanism, an abnormality in which the shift-by-wire mechanism is not able to change the state of the power transmission device to the parked state.

When the abnormality occurs in the shift-by-wire mechanism, the on condition is not satisfied, so that the ignition cannot be changed to the on state again. When the abnormality occurs in the shift-by-wire mechanism, the ignition is maintained in the on state. This makes it possible to suppress the vehicle that cannot travel because the ignition cannot be changed to the on state from being left unattended on the road.

In the above aspect,
the on condition further includes a condition that an electric parking brake is operated; and the control unit is configured to
further operate the electric parking brake when the vehicle reaches the target parking position in the automatic parking control (step 222 and step 820), and
preset, as the specific abnormality, an abnormality in which the electric parking brake is not able to be operated.

When the abnormality occurs in which the electric parking brake is not able to be operated, the on condition is not satisfied, so that the ignition cannot be changed to the on state again. When the abnormality occurs in which the electric parking brake is not able to be operated, the ignition is maintained in the on state. This makes it possible to suppress the vehicle that cannot travel because the ignition cannot be changed to the on state from being left unattended on the road.

In one aspect of the present disclosure device,
the control unit is configured to display a notification screen for notifying the user that the specific abnormality has occurred on the mobile terminal (step 404, step 408, and step 525) when the specific abnormality occurs during the execution of the automatic parking control (step 402, step 510 "Yes", and step 515).

As a result, the user outside the vehicle can know that the specific abnormality has occurred by looking at the notification screen displayed on the mobile terminal.

In the above description, in order to help understanding of the disclosure, the names and/or the reference symbols used in the embodiment are added in parentheses to the configurations of the disclosure corresponding to the embodiment to be described later. However, respective components of the disclosure are not limited to the embodiment defined by the above names and/or reference symbols. Other objects, other features and accompanying advantages of the present disclosure will be readily understood from the description of embodiments of the present disclosure described with reference to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Structure

Figure 1:
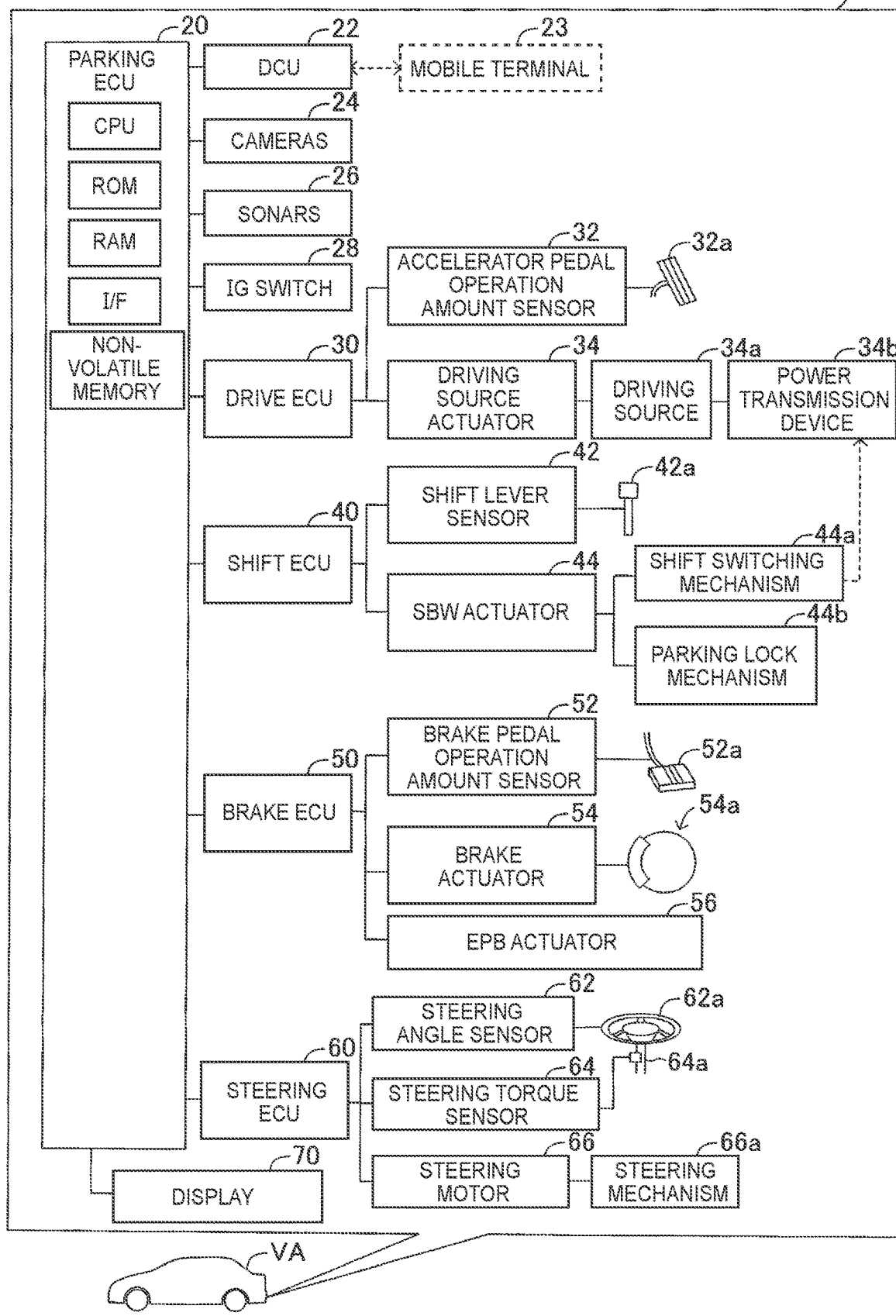
FIG. 1 is a schematic configuration diagram of a vehicle control device according to an embodiment of the present disclosure.

As shown in FIG. 1, a vehicle control device 10 according to the present embodiment (hereinafter referred to as the "control device 10") is mounted (applied) on (to) a vehicle VA. The control device 10 includes a parking ECU 20, a drive ECU 30, a shift ECU 40, a brake ECU 50, and a steering ECU 60. These ECUs 20, 30, 40, 50 and 60 are connected so as to be able to transmit and receive data to and from each other via a controller area network (CAN) (not shown).

The ECU is an abbreviation for an electronic control unit, and is an electronic control circuit having a microcomputer including a central processing unit (CPU), a read-only memory (ROM), a random access memory (RAM), a non-volatile memory, an interface, and the like as a main component. The "non-volatile memory" is a storage device (for example, an electrically erasable programmable read-only memory (EEPROM), a hard disk, etc.) capable of writing, reading, and erasing data. The ECU may be referred to as a "control unit" or a "controller". The CPU realizes various functions by executing instructions (routines) stored in the memory (ROM). All or some of the above ECUs 20, 30, 40, 50 and 60 may be integrated into one ECU. A part of the functions of the above ECUs 20, 30, 40, 50 and 60 may be realized by other ECUs 20, 30, 40, 50 and 60.

The control device 10 includes a data communication unit (hereinafter referred to as a "DCU", and may also be referred to as a "communication unit" and a "communication module") 22, a plurality of cameras 24, a plurality of sonars 26, and an ignition (IG) switch (also referred to as a "start switch" or a "ready switch") 28. These units 22 to 28 are connected to the parking ECU 20 so as to be able to exchange data with the parking ECU 20.

The DCU 22 transmits and receives data to and from a mobile terminal (for example, a smartphone, a mobile tablet, etc.) 23 that is a communication device carried by a user of the vehicle VA. For example, the DCU 22 performs data communication with the mobile terminal 23 by well-known short-range wireless communication (for example, Bluetooth (registered trademark)).

The cameras 24 include a front camera, a rear camera, a left camera, and a right camera. Each of the cameras 24 generates image data by capturing an image of an area described below every time a predetermined time elapses, and transmits the image data to the parking ECU 20. The front camera, the rear camera, the left camera, and the right camera capture an image of an area in front of the vehicle VA, an image of an area behind the vehicle VA, an image of an area on the left side of the vehicle VA, and an image of an area on the right side of the vehicle VA, respectively.

The sonars 26 include a front sonar, a rear sonar, a left sonar, and a right sonar. Each of the sonars 26 transmits a sound wave to an area described below, and receives a reflected wave of the sound wave from an object. Each of the sonars 26 transmits information regarding the transmitted sound wave and the received reflected wave (that is, sonar data) to the parking ECU 20 every time a predetermined time elapses. The front sonar, the rear sonar, the left sonar, and the right sonar transmit sound waves to the area in front of the vehicle VA, the area behind the vehicle VA, the area on the left side of the vehicle VA, and the area on the right side of the vehicle VA, respectively.

The parking ECU 20 recognizes an object existing around the vehicle VA based on the image data and the sonar data, and recognizes a white line on a road surface around the vehicle VA based on the image data.

The IG switch 28 is provided in a vehicle cabin of the vehicle VA. When the user (driver) getting on the vehicle VA operates the IG switch 28 in the off position, the IG switch 28 is changed from the off position to the on position. When the user operates the IG switch 28 in the on position, the IG switch 28 is changed from the on position to the off position.

The drive ECU 30 is connected to an accelerator pedal operation amount sensor 32 and a driving source actuator 34 so as to be able to exchange data with the accelerator pedal operation amount sensor 32 and the driving source actuator 34.

The accelerator pedal operation amount sensor 32 detects an accelerator pedal operation amount AP that is an operation amount of an accelerator pedal 32a by the driver, and generates a signal representing the accelerator pedal operation amount AP. The drive ECU 30 specifies the accelerator pedal operation amount AP based on the signal generated by the accelerator pedal operation amount sensor 32.

The driving source actuator 34 is connected to a driving source (motor, internal combustion engine, etc.) 34a that generates the driving force applied to the vehicle VA. The driving source 34a may be referred to as a "drive device". The drive ECU 30 changes an operating state of the driving source 34a by controlling the driving source actuator 34. As a result, the drive ECU 30 can adjust the driving force applied to the drive wheels of the vehicle VA from the driving source 34a via a power transmission device 34b. The drive ECU 30 controls the driving source actuator 34 such that the driving force applied to the drive wheels increases as the accelerator pedal operation amount AP increases.

The shift ECU 40 is connected to a shift lever sensor 42 and a shift-by-wire (SBW) actuator 44 so as to be able to exchange data with the shift lever sensor 42 and the shift-by-wire (SBW) actuator 44.

The shift lever sensor 42 detects a position of the shift lever 42a (hereinafter referred to as a "lever position"), and generates a detection signal indicating its position.

The SBW actuator 44 is connected to a shift switching mechanism 44a and a parking lock mechanism 44b.

The shift switching mechanism 44a switches a shift position of the power transmission device 34b to one of a plurality of shift positions. The shift ECU 40 specifies a lever position based on the detection signal from the shift lever sensor 42 every time a predetermined time elapses. When the lever position is changed from the previous lever position, the shift ECU 40 controls the SBW actuator 44 and causes the shift switching mechanism 44a to change the shift position of the power transmission device 34b to a "shift position corresponding to the changed lever position".

The parking lock mechanism 44b is provided in the power transmission device 34b, and stops the drive wheels when the lever position is in "P" to prohibit forward and reverse movements of the vehicle VA and maintain the stopped state of the vehicle VA.

When the lever position is changed to "P", the shift ECU 40 controls the SBW actuator 44 to cause the shift switching mechanism 44a to change the shift position to a position where the driving force is not transmitted to the drive wheels (non-transmission position). Further, the shift ECU 40 controls the SBW actuator 44, and causes the parking lock mechanism 44b to stop the drive wheels. Hereinafter, the state of the power transmission device 34b is referred to as a "parked state".

When the lever position is changed to "N", the shift ECU 40 controls the SBW actuator 44 to cause the shift switching mechanism 44a to change the shift position to the non-transmission position.

When the lever position is changed to "D", the shift ECU 40 controls the SBW actuator 44 to cause the shift switching mechanism 44a to change the shift position to a "position where the driving force for moving the vehicle VA forward is transmitted to the drive wheels (forward position)".

When the lever position is changed to "R", the shift ECU 40 controls the SBW actuator 44 to cause the shift switching mechanism 44a to change the shift position to a "position where the driving force for moving the vehicle VA rearward is transmitted to the drive wheels (reverse position)".

When the lever position is in any one of "N", "D", and "R", the shift ECU 40 does not cause the parking lock mechanism 44b to stop the drive wheels.

As described above, the shift ECU 40 controls the SBW actuator 44 to change the state of the power transmission device 34b (shift position and stop/non-stop of the drive wheels) to a state corresponding to the lever position. Such a control method is called the well-known shift-by-wire method. The shift lever sensor 42, the SBW actuator 44, the shift switching mechanism 44a, and the parking lock mechanism 44b may be collectively referred to as a "shift-by-wire mechanism".

The shift ECU 40 can control the shift switching mechanism 44a and the parking lock mechanism 44b via the SBW actuator 44 in response to a command from the parking ECU 20 without operating the shift lever 42a.

The brake ECU 50 is connected to a brake pedal operation amount sensor 52, a brake actuator 54, and an electric parking brake (EPB) actuator 56 so as to be able to exchange data with the brake pedal operation amount sensor 52, the brake actuator 54, and the EPB actuator 56.

The brake pedal operation amount sensor 52 detects a brake pedal operation amount BP that is an operation amount of the brake pedal 52a, and generates a signal representing the brake pedal operation amount BP. The brake ECU 50 specifies the brake pedal operation amount BP based on the signal generated by the brake pedal operation amount sensor 52.

The brake actuator 54 is connected to a well-known hydraulic braking device 54a. The brake ECU 50 changes friction braking force generated by the braking device 54a by controlling the brake actuator 54. As a result, the brake ECU 50 can adjust braking force applied to the vehicle VA. The brake ECU 50 controls the brake actuator 54 such that the braking force applied to the vehicle VA increases as the brake pedal operation amount BP increases.

When the EPB actuator 56 is operated by the brake ECU 50, the EPB actuator 56 generates the friction braking force on the wheels. Hereinafter, braking of the vehicle VA by the operation of the EPB actuator 56 is referred to as "EPB braking".

The steering ECU 60 is connected to a steering angle sensor 62, a steering torque sensor 64, and a steering motor 66.

The steering angle sensor 62 detects a rotation angle of a steering wheel 62a from the neutral position thereof as a steering angle θs, and generates a signal representing the steering angle θs. The steering ECU 60 specifies the steering angle θs based on the signal generated by the steering angle sensor 62.

The steering torque sensor 64 detects steering torque Tr representing torque acting on a steering shaft 64a connected to the steering wheel 62a, and generates a signal representing the steering torque Tr. The steering ECU 60 specifies the steering torque Tr based on the signal generated by the steering torque sensor 64.

The steering motor 66 generates torque according to electric power supplied from a vehicle battery (not shown). The steering ECU 60 controls the direction and magnitude of the electric power supplied to the steering motor 66. The steering motor 66 is incorporated such that the torque can be transmitted to a steering mechanism 66a of the vehicle VA. The steering mechanism 66a includes the steering wheel 62a, the steering shaft 64a, a steering gear mechanism, and the like. The torque generated by the steering motor 66 is generated by steering assist torque to steer (turn) right and left steered wheels.

The steering ECU 60 normally generates the steering assist torque corresponding to the steering torque Tr by using the steering motor 66.

Further, the parking ECU 20 is connected to a display 70 provided in the vehicle cabin of the vehicle VA so as to be able to exchange data with the display 70. The display 70 displays various kinds of information. For example, the display 70 displays an abnormality that has occurred in the vehicle VA.

Outline of Operation

The control device 10 executes "automatic parking control for causing the vehicle VA to travel to a predetermined target parking position and parking the vehicle VA in the target parking position based on the operation (remote operation) on the mobile terminal 23 of the user outside the vehicle VA". When an abnormality occurs during the execution of this automatic parking control, the control device 10 decelerates the vehicle VA and stops the vehicle VA.

When the vehicle VA is stopped, the control device 10 changes the state of the power transmission device 34b to the parked state, operates the EPB actuator 56, and changes the ignition from the on state to the off state.

After that, the user gets on the vehicle VA and operates the IG switch 28 to change the ignition from the off state to the on state, the display 70 displays the abnormality that has occurred. As a result, the user can know that the abnormality has occurred.

By the way, when the user operates the IG switch 28 to change the ignition from the off state to the on state, a predetermined on condition needs to be satisfied. This on condition is satisfied when the state of the power transmission device 34b is in the parked state and the EPB actuator 56 is operated.

An abnormality may occur in which the on condition is not satisfied (that is, an abnormality that does not allow the ignition to be changed to the on state). Such an abnormality is called a "specific abnormality". The control device 10 presets an abnormality applicable to the specific abnormality. When the specific abnormality occurs and the ignition is changed to the off state after the vehicle VA is stopped, the control device 10 cannot change the ignition to the on state again. For this reason, a situation occurs in which the vehicle VA that cannot travel continues to be stopped on the road. Further, in this case, since the abnormality that has occurred is not displayed on the display 70, the user cannot know that the abnormality has occurred.

Therefore, when the preset specific abnormality occurs, and the vehicle VA decelerates and is stopped, the control device 10 does not change the ignition to the off state and maintains the on state. As a result, the user can know that the abnormality has occurred by looking at the display 70 after getting on the vehicle VA, and can move the vehicle VA to an appropriate place.

Operation Example

Figure 2:
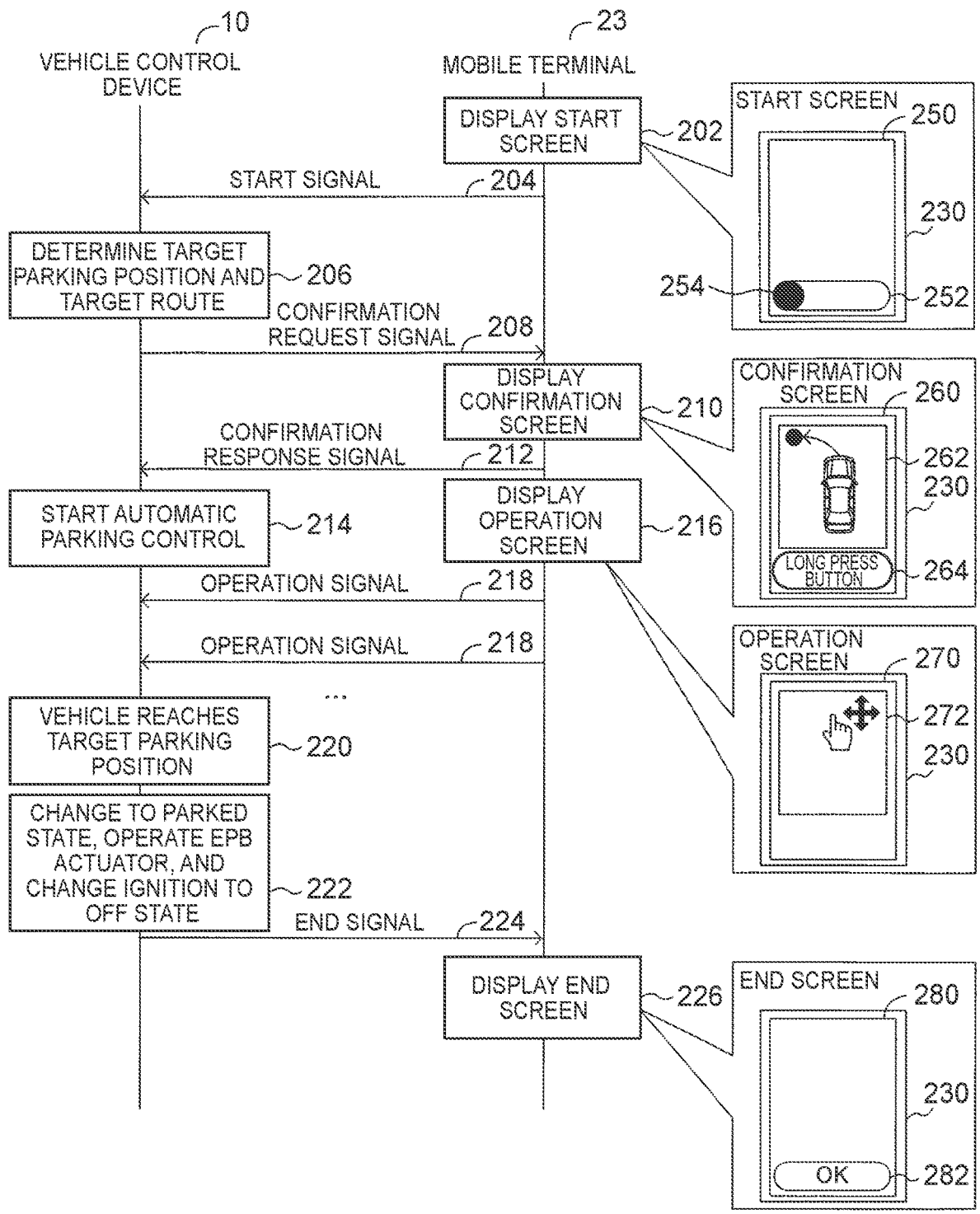
FIG. 2 is a sequence diagram for illustrating an operation example of automatic parking control.

With reference to FIG. 2, an operation example of the control device 10 when the vehicle VA reaches the target parking position without any abnormality during the execution of the automatic parking control will be described.

When the mobile terminal 23 activates the automatic parking application, the mobile terminal 23 displays a start screen 250 on its touch panel type display 230.

The start screen 250 includes a slide operation area 252. In the initial state of the start screen 250, an operation display element 254 is located at the left end of the slide operation area 252. When the user outside the vehicle slides the operation display element 254 to the right end of the slide operation area 252, the mobile terminal 23 transmits a start signal to the vehicle control device 10 (step 204).

When the control device 10 receives the start signal, the control device 10 determines the target parking position and a target travel route based on the image data and the sonar data (step 206). After that, the control device 10 transmits a confirmation request signal to the mobile terminal 23 (step 208). The confirmation request signal includes image data related to a confirmation image. The confirmation image is an image in which the target parking position and the target travel route are plotted (superimposed) on an "overhead image when the area in a predetermined range in which the vehicle VA is centered is viewed from directly above", and is generated based on the image data generated by the cameras 24.

Upon receiving the confirmation request signal, the mobile terminal 23 displays a confirmation screen 260 on the display 230 (step 210). The confirmation screen 260 includes a vehicle stop position display area 262 and a long press button 264. When the user looks at the confirmation image displayed in the vehicle stop position display area 262 and agrees to the target parking position and the target travel route, the user touches the long press button 264. When the long press button 264 is touched for a predetermined time or longer, the mobile terminal 23 transmits a confirmation response signal (control start signal) to the control device 10 (step 212).

When the control device 10 receives the confirmation response signal, the control device 10 determines that a predetermined start condition is satisfied and starts the automatic parking control (step 214). When the long press button 264 is touched on the confirmation screen 260 for a predetermined time or longer, the mobile terminal 23 displays an operation screen 270 on the display 230 (step 216).

The operation screen 270 includes an operation area 272. When the user traces the operation area 272 with the finger and the touch position in the operation area 272 is continuously changed, the mobile terminal 23 continues to transmit the operation signal to the control device 10 every time a predetermined time elapses (step 218).

Once the automatic parking control is started, the control device 10 continues to cause the vehicle VA to travel along the target travel route until the vehicle VA reaches the target stop position as long as the operation signal is received.

Specifically, the parking ECU 20 acquires target acceleration for the vehicle VA to travel along the target travel route and stop in the target parking position, and transmits an acceleration and deceleration command including the target acceleration to the drive ECU 30 and the brake ECU 50. The drive ECU 30 and the brake ECU 50 control the driving source actuator 34 and the brake actuator 54, respectively, such that the acceleration of the vehicle VA matches the target acceleration included in the acceleration and deceleration command.

Further, the parking ECU 20 acquires a target steering angle for the vehicle VA to travel along the target travel route, and transmits a steering command including the target steering angle to the steering ECU 60. The steering ECU 60 controls the steering motor 66 such that the steering angle θs matches the target steering angle included in the steering command.

When the vehicle VA reaches the target parking position (step 220), the control device 10 changes the state of the power transmission device 34b to the parked state, operates the EPB actuator 56, and changes the ignition to the off state (step 222). Further, the control device 10 transmits an end signal to the mobile terminal 23 (step 224).

Upon receiving the end signal, the mobile terminal 23 displays an end screen 280 on the display 230. The end screen 280 includes an OK button 282. The mobile terminal 23 ends the automatic parking application when the OK button 282 is operated.

Figure 3:
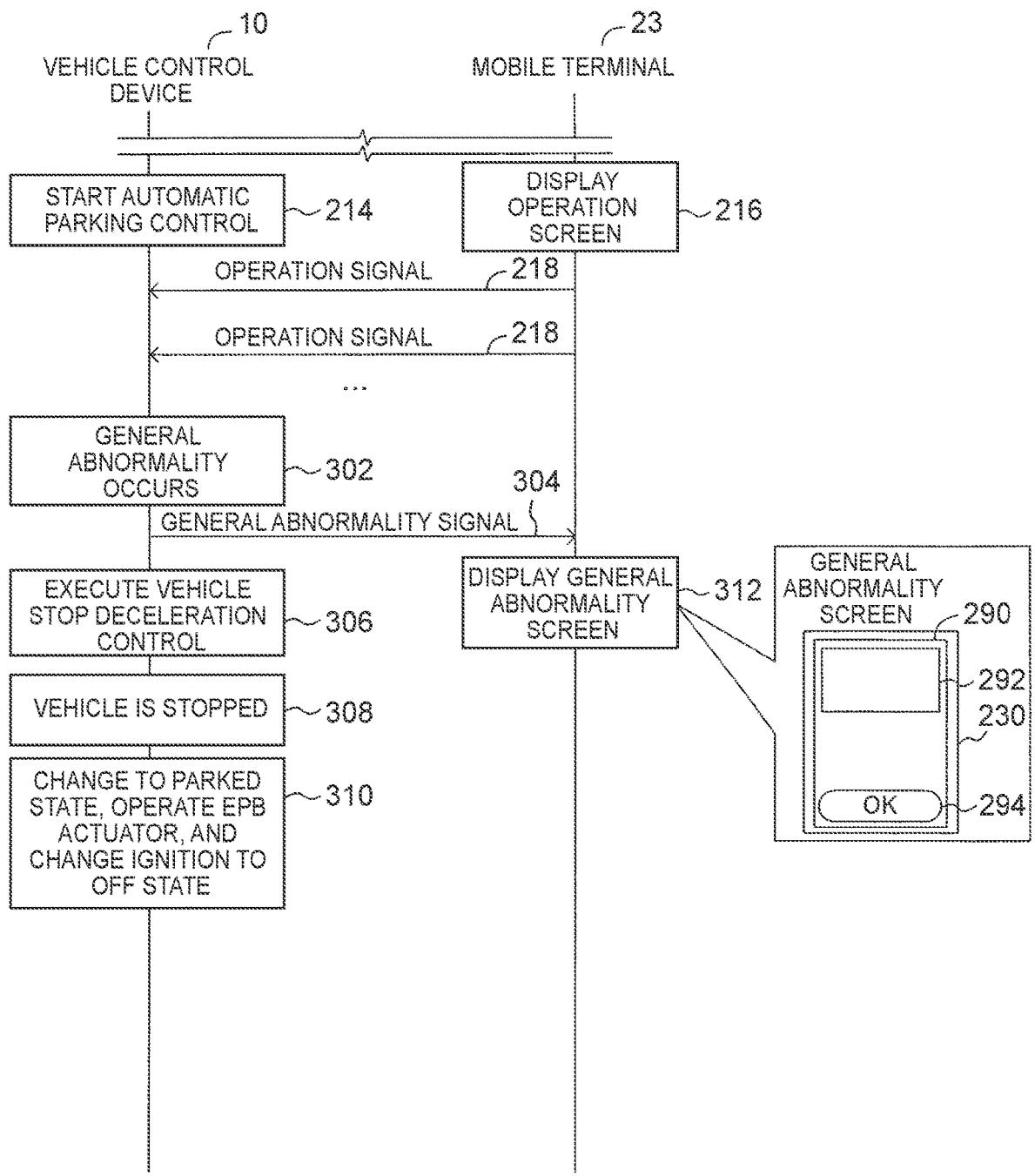
FIG. 3 is a sequence diagram for illustrating an operation example when a general abnormality occurs during execution of the automatic parking control.

With reference to FIG. 3, an operation example of the control device 10 when an abnormality other than the specific abnormality (hereinafter referred to as a "general abnormality") occurs during the execution of the automatic parking control will be described. In FIG. 3, the same reference symbols as those used in FIG. 2 are assigned to the steps in which the same processing as in the steps shown in FIG. 2 is executed, and the description thereof will be omitted.

When the general abnormality occurs after the automatic parking control is started in step 214 shown in FIG. 3 (step 302), the control device 10 transmits a general abnormality signal to the mobile terminal 23 (step 304). Further, the control device 10 executes vehicle stop deceleration control (step 306). In the vehicle stop deceleration control, the control device 10 controls the driving source actuator 34 and the brake actuator 54 such that the acceleration of the vehicle VA matches predetermined negative acceleration (that is, predetermined deceleration).

When the vehicle VA is stopped by the vehicle stop deceleration control (step 308), the control device 10 changes the state of the power transmission device 34b to the parked state, operates the EPB actuator 56, and changes the ignition to the off state (step 310).

The vehicle stop deceleration control when the general abnormality occurs and the above control when the vehicle VA is stopped may be referred to as "first abnormality vehicle stop control".

Upon receiving the general abnormality signal, the mobile terminal 23 displays a general abnormality screen 290 on the display 230 (step 312). The general abnormality screen 290 includes an abnormality message area 292 and an OK button 294. In the abnormality message area 292, a message indicating that the general abnormality has occurred is displayed. When the OK button 294 is operated, the mobile terminal 23 ends displaying the general abnormality screen 290 on the display 230.

Figure 4:
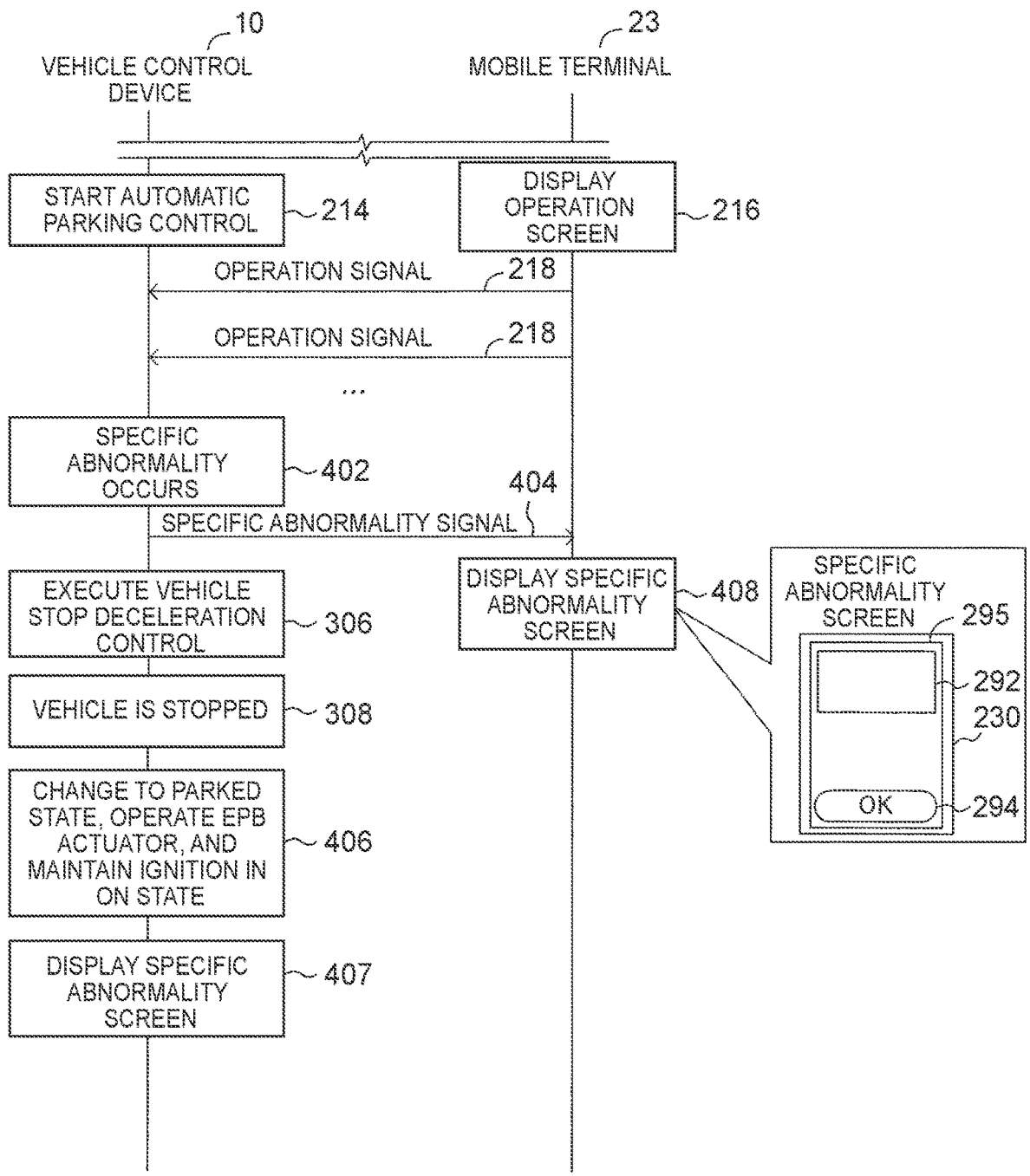
FIG. 4 is a sequence diagram for illustrating an operation example when a specific abnormality occurs during execution of the automatic parking control.

With reference to FIG. 4, an operation example of the control device 10 when the specific abnormality has occurred during the execution of the automatic parking control will be described. In FIG. 4, the same reference symbols as those used in FIGS. 2 and 3 are assigned to the steps in which the same processing as in the steps shown in FIGS. 2 and 3 is executed, and the description thereof will be omitted.

When the specific abnormality occurs after the start of the automatic parking control (step 214 shown in FIG. 4) (step 402), the control device 10 transmits the specific abnormality signal to the mobile terminal 23 (step 404), and executes the vehicle stop deceleration control (step 306 shown in FIG. 4). When the vehicle VA is stopped by the vehicle stop deceleration control (step 308 shown in FIG. 4), the control device 10 changes the state of the power transmission device 34b to the parked state, operates the EPB actuator 56, and maintains the ignition in the on state (step 406).

The vehicle stop deceleration control when the specific abnormality has occurred and the above control when the vehicle VA is stopped may be referred to as "second abnormality vehicle stop control".

Further, the control device 10 displays a specific abnormality screen on the display 70 (step 407). On this specific abnormality screen, a message indicating that the specific abnormality has occurred and prompting the operation of the brake pedal 52a is displayed.

Upon receiving the specific abnormality signal, the mobile terminal 23 displays a specific abnormality screen 295 on the display 230 (step 408). The specific abnormality screen 295 includes the abnormality message area 292 and the OK button 294, similarly to the general abnormality screen 290. In the abnormality message area 292, a message indicating that the specific abnormality has occurred and prompting the user to get on the vehicle VA and operate the brake pedal 52a is displayed.

The user outside the vehicle VA can know that the specific abnormality has occurred by looking at the specific abnormality screen 295. Then, the user gets on the vehicle VA and operates the brake pedal 52a. The vehicle VA transitions to a state in which the user can drive the vehicle VA by operating the brake pedal 52a. Therefore, the user drives the vehicle VA, so that the vehicle VA can be moved to an appropriate place.

Specific Operation

Abnormality Determination Routine

The CPU of the parking ECU 20 (hereinafter, "CPU" in the description refers to the CPU of the parking ECU 20 unless otherwise specified) executes an abnormality determination routine shown by the flowchart in FIG. 5 every time a predetermined time elapses.

Figure 5:
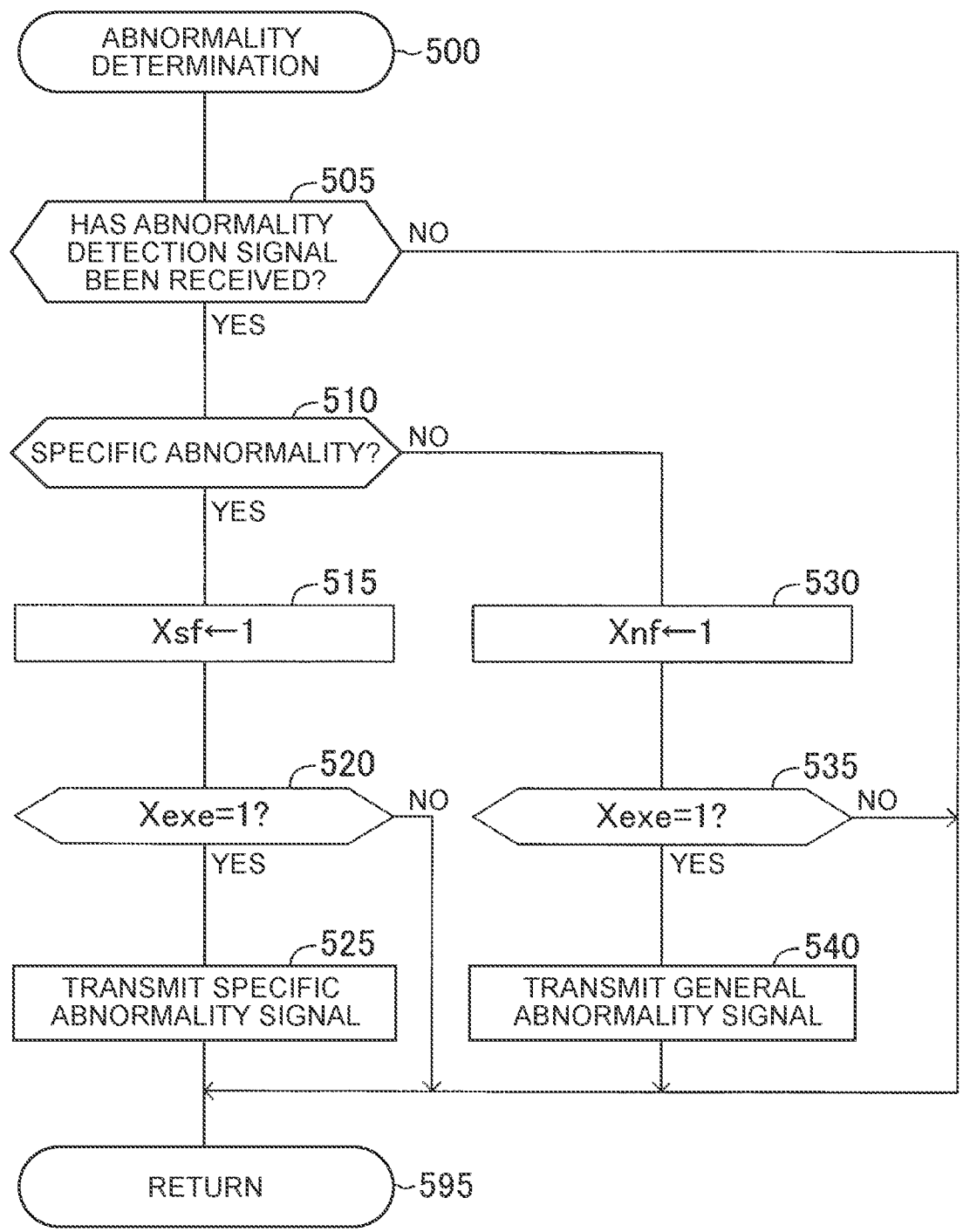
FIG. 5 is a flowchart showing an abnormality determination routine executed by a central processing unit (CPU) of a parking electronic control unit (ECU)

Therefore, at a predetermined timing, the CPU starts the process from step 500 in FIG. 5, proceeds to step 505, and determines whether the parking ECU 20 has received the abnormality detection signal. When an abnormality is detected, various devices mounted on the vehicle VA transmit the abnormality detection signal to the parking ECU 20.

When the parking ECU 20 has not received the abnormality detection signal, the CPU determines "No" in step 505, proceeds to step 595, and temporarily ends this routine.

When the parking ECU 20 has received the abnormality detection signal, the CPU determines "Yes" in step 505 and proceeds to step 510. In step 510, the CPU determines whether the abnormality that has occurred is a specific abnormality based on the abnormality detection signal. The abnormality detection signal includes abnormality identification information that can identify what kind of abnormality has occurred in which device.

The ROM of the parking ECU 20 stores the abnormality identification information for determining the specific abnormality.

As an example, the abnormality identification information indicating the following abnormalities is stored in the ROM.

Abnormality Related to the Driving Source 34a (Driving Source Abnormality)

More specifically, the driving source abnormality is an abnormality in which the vehicle VA can travel, but the ignition cannot be changed to the on state.

For example, when the driving source 34a is an internal combustion engine, the driving source abnormality is an abnormality of a starter motor (not shown).

When the driving source 34a is an electric motor, the driving source abnormality is an abnormality of a relay circuit (not shown). This relay circuit is a circuit for changing from "a non-energized state in which electric connection between the electric motor and a battery (not shown) is cut off" to "an energized state in which the electric motor and the battery (not shown) are electrically connected".

When the driving source 34a is composed of the internal combustion engine and the electric motor, the driving source abnormality is an abnormality of the electric motor that generates the driving force at the time of starting the vehicle.

Abnormality Related to the Shift-by-Wire Mechanism (SBW Abnormality)

More specifically, the SBW abnormality includes an abnormality in which the shift-by-wire mechanism cannot change the state of the power transmission device 34b to the parked state, and is, for example, an abnormality of the shift lever sensor 42, an abnormality of the shift switching mechanism 44a, an abnormality of the parking lock mechanism 44b, and the like. When the state of the power transmission device 34b cannot be changed to the parked state, the above-mentioned on condition is not satisfied, and even when the IG switch 28 is operated, the ignition cannot be changed to the on state.

Abnormality Related to the EPB Actuator 56

When an abnormality occurs in which the EPB actuator 56 cannot be operated, the above-mentioned on condition is not satisfied, and even when the IG switch 28 is operated, the ignition cannot be changed to the on state.

When the abnormality that has occurred is the specific abnormality, the CPU determines "Yes" in step 510, and executes step 515 and step 520 in order.

Step 515: The CPU sets a value of the specific abnormality flag Xsf to "1".

The value of the specific abnormality flag Xsf is set to "1" when the specific abnormality occurs, and is set to "0" when the specific abnormality does not occur.

Step 520: the CPU determines whether a value of the execution flag Xexe is "1".

The value of the execution flag Xexe is set to "1" when the automatic parking control is executed, and is set to "0" when the automatic parking control is not executed. The value of the execution flag Xexe is set to "0" in the initial routine executed by the CPU when the ignition is changed from the off state to the on state.

When the value of the execution flag Xexe is "0", the CPU determines "No" in step 520, proceeds to step 595, and temporarily ends this routine.

On the contrary, when the value of the execution flag Xexe is "1", the CPU determines "Yes" in step 520, proceeds to step 525, and transmits the specific abnormality signal to the mobile terminal 23. After that, the CPU proceeds to step 595 and temporarily ends this routine.

On the other hand, when the CPU proceeds to step 510, and the abnormality that has occurred is not the specific abnormality (that is, when the abnormality that has occurred is the general abnormality), the CPU determines "No" in step 510, and executes step 530 and step 535 in order.

Step 530: The CPU sets a value of the general abnormality flag Xnf to "1".

The value of the general abnormality flag Xnf is set to "1" when the general abnormality occurs, and is set to "0" when the general abnormality does not occur.

Step 535: the CPU determines whether the value of the execution flag Xexe is "1".

When the value of the execution flag Xexe is "0", the CPU determines "No" in step 535, proceeds to step 595, and temporarily ends this routine.

On the contrary, when the value of the execution flag Xexe is "1", the CPU determines "Yes" in step 535, proceeds to step 540, and transmits the general abnormality signal to the mobile terminal 23. After that, the CPU proceeds to step 595 and temporarily ends this routine.

The value of the specific abnormality flag Xsf (or the general abnormality flag Xnf) is set to "0" when the specific abnormality (or the general abnormality) is repaired by a repair company or the like.

Further, the CPU displays the specific abnormality screen on the display 70 when the specific abnormality flag Xsf is "1" during the period when the ignition is in the on state, and the CPU displays the general abnormality screen for notifying the driver that the general abnormality has occurred on the display 70 when the general abnormality flag Xnf is "1".

Automatic Parking Control Routine

Figure 6:
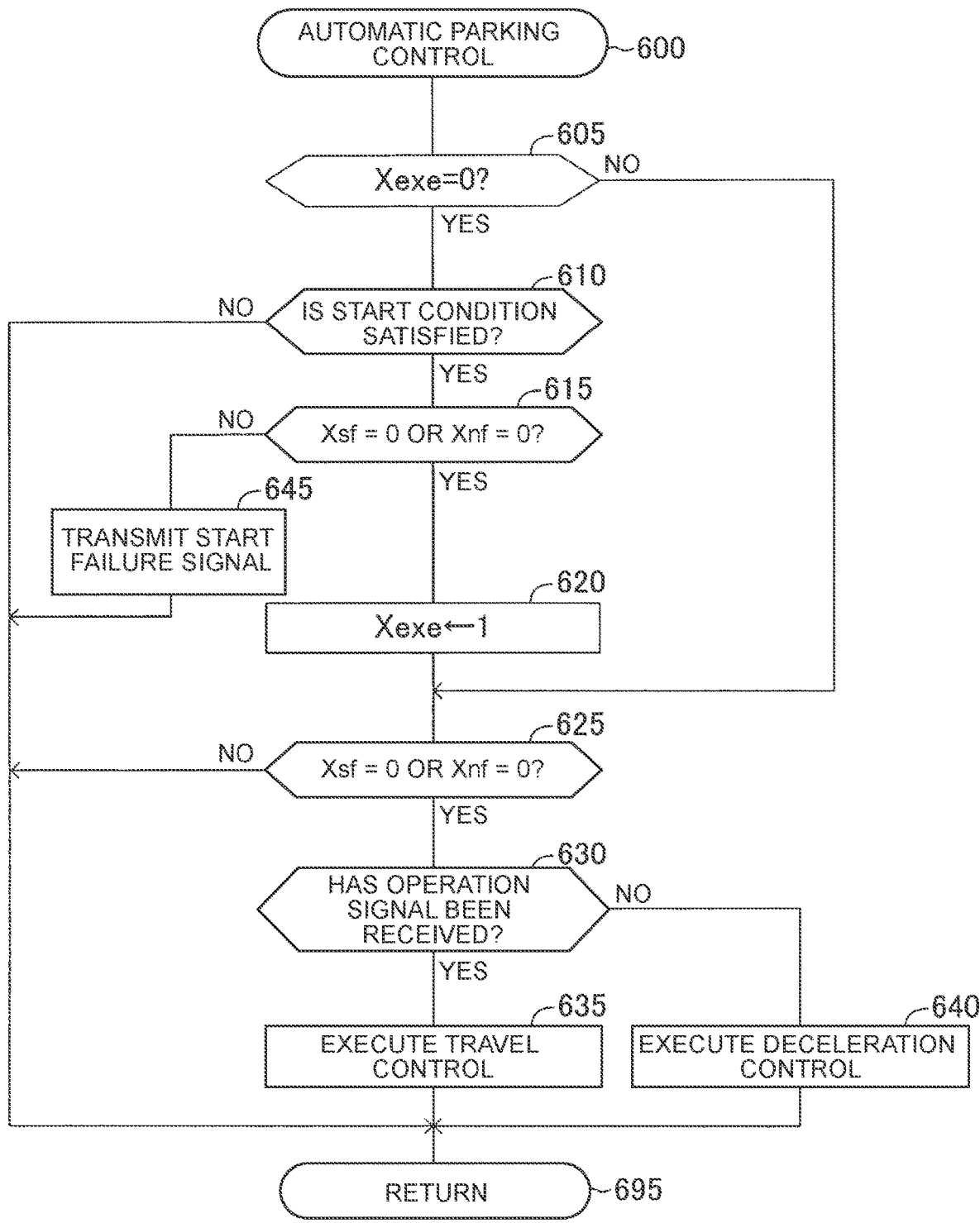
FIG. 6 is a flowchart showing an automatic parking control routine executed by the CPU of the parking ECU.

The CPU executes the automatic parking control routine shown by the flowchart in FIG. 6 every time a predetermined time elapses.

Therefore, at a predetermined timing, the CPU starts the process from step 600 in FIG. 6, proceeds to step 605, and determines whether the value of the execution flag Xexe is "0".

When the value of the execution flag Xexe is "0", the CPU determines "Yes" in step 605, proceeds to step 610, and determines whether "a start condition that the confirmation response signal transmitted by the mobile terminal 23 is received" is satisfied.

When the start condition is not satisfied, the CPU determines "No" in step 610, proceeds to step 695, and temporarily ends this routine.

When the start condition is satisfied, the CPU determines "Yes" in step 610, proceeds to step 615, and determines whether the value of the specific abnormality flag Xsf is "0" and the value of the general abnormality flag Xnf is "0".

When the value of the specific abnormality flag Xsf is "0" and the value of the general abnormality flag Xnf is "0", the CPU determines "Yes" in step 615 and executes step 620 and step 625 in order.

Step 620: The CPU sets the value of the execution flag Xexe to "1".

Step 625: The CPU determines whether the value of the specific abnormality flag Xsf is "0" and the value of the general abnormality flag Xnf is "0".

When the value of the specific abnormality flag Xsf is "0" and the value of the general abnormality flag Xnf is "0", the CPU determines "Yes" in step 625 and proceeds to step 630. In step 630, the CPU determines whether the operation signal transmitted by the mobile terminal 23 has been received.

When the operation signal has been received, the CPU determines "Yes" in step 630 and proceeds to step 635. At step 635, the CPU executes travel control for causing the vehicle VA to travel to the target parking position along the target travel route, proceeds to step 695, and temporarily ends this routine. More specifically, the CPU acquires the target acceleration and transmits the acceleration and deceleration command including the target acceleration to the drive ECU 30 and the brake ECU 50. Further, the CPU acquires the target steering angle and transmits the steering command including the target steering angle to the steering ECU 60.

When the operation signal is not received, the CPU determines "No" in step 630, executes deceleration control for decelerating the vehicle VA, proceeds to step 695, and temporarily ends this routine. More specifically, the CPU transmits the acceleration and deceleration command including predetermined negative target acceleration to the drive ECU 30 and the brake ECU 50.

On the other hand, when the CPU proceeds to step 605, and the value of the execution flag Xexe is "1", the CPU determines "No" in step 605 and proceeds to the process after step 625.

On the other hand, when the CPU proceeds to step 615 and the value of at least one of the specific abnormality flag Xsf and the general abnormality flag Xnf is "1" (that is, when the specific abnormality and/or the general abnormality occurs although the start condition is satisfied), the CPU determines "No" in step 615 and proceeds to step 645. At step 645, the CPU transmits a start failure signal to the mobile terminal 23, proceeds to step 695, and temporarily ends this routine.

When the mobile terminal 23 receives the start failure signal, the mobile terminal 23 displays, on the display 230, a message indicating that the automatic parking control cannot be started because the abnormality occurs in the vehicle VA.

On the other hand, when the CPU proceeds to step 625 and the value of at least one of the specific abnormality flag Xsf and the general abnormality flag Xnf is "1" (that is, when the specific abnormality and/or the general abnormality occurs after the automatic parking control is started), the CPU determines "No" in step 625, proceeds to step 695, and temporarily ends this routine.

Control Routine while Abnormality Occurs

Figure 7:
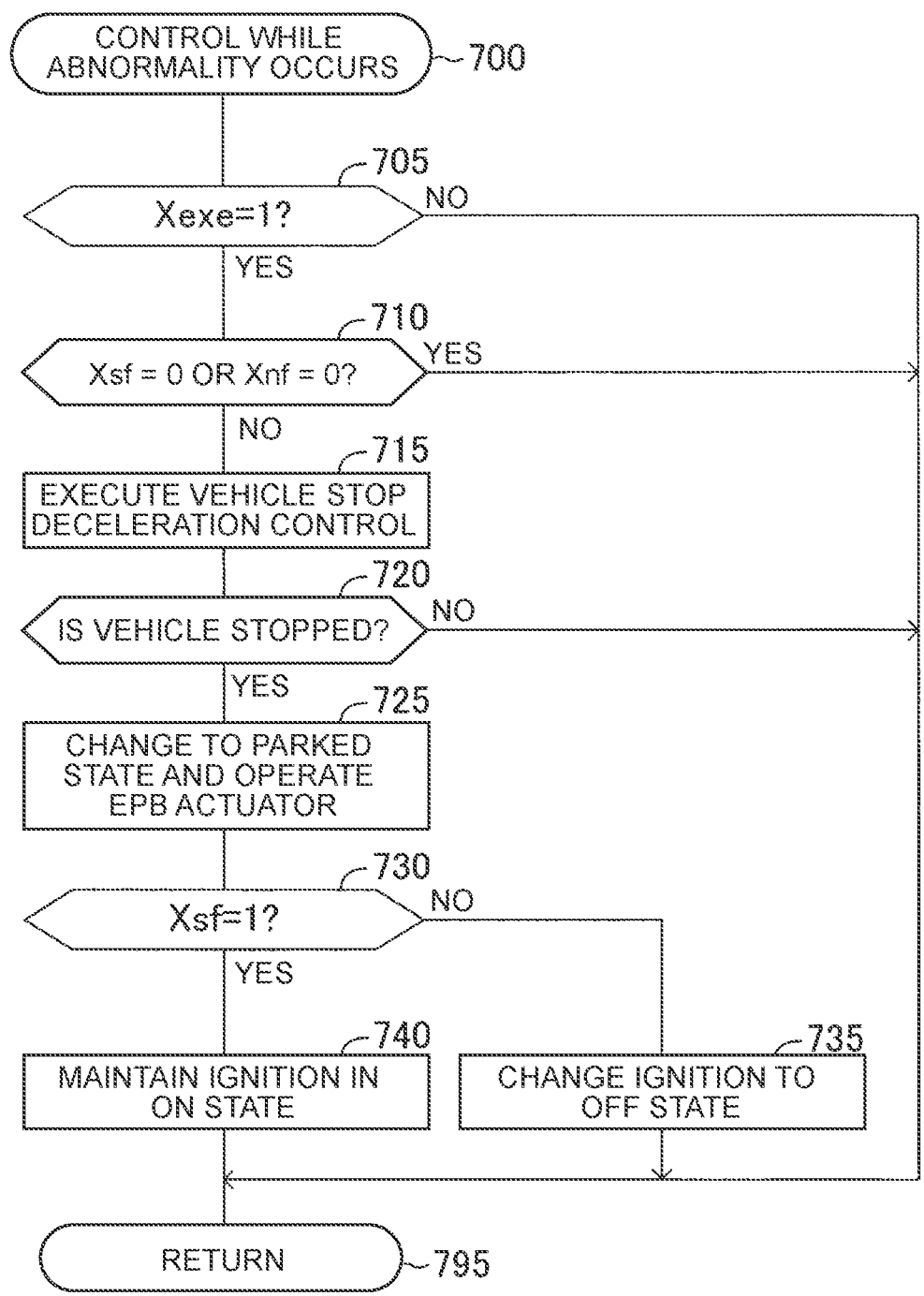
FIG. 7 is a flowchart showing a control routine while an abnormality occurs, the control routine being executed by the CPU of the parking ECU.

The CPU executes the control routine while an abnormality occurs, which is shown by the flowchart in FIG. 7, every time a predetermined time elapses.

Therefore, at a predetermined timing, the CPU starts the process from step 700 in FIG. 7, proceeds to step 705, and determines whether the value of the execution flag Xexe is "1".

When the value of the execution flag Xexe is "0", the CPU determines "No" in step 705, proceeds to step 795, and temporarily ends this routine.

When the value of the execution flag Xexe is "1", the CPU proceeds to step 710 and determines whether the value of the specific abnormality flag Xsf is "0" and the value of the general abnormality flag Xnf is "0".

When the value of the specific abnormality flag Xsf is "0" and the value of the general abnormality flag Xnf is "0", the CPU determines "Yes" in step 710, proceeds to step 795, and temporarily ends this routine.

When the value of at least one of the specific abnormality flag Xsf and the general abnormality flag Xnf is "1", the CPU determines "No" in step 710 and executes step 715 and step 720 in order.

Step 715: The CPU executes the vehicle stop deceleration control.

Step 720: The CPU determines whether the vehicle VA is stopped.

When the vehicle VA is not stopped, the CPU determines "No" in step 720, proceeds to step 795, and temporarily ends this routine.

On the contrary, when the vehicle VA is stopped, the CPU determines "Yes" in step 720, and executes step 725 and step 730 in order.

Step 725: The CPU changes the state of the power transmission device 34b to the parked state and operates the EPB actuator 56.

Step 730: The CPU determines whether the value of the specific abnormality flag Xsf is "1".

When the value of the specific abnormality flag Xsf is "0", the CPU determines "No" in step 730, proceeds to step 735, and changes the ignition to the off state. After that, the CPU proceeds to step 795 and temporarily ends this routine.

When the CPU determines "No" in step 730, the value of the execution flag Xexe is not set to "0", but after that, the value of the execution flag Xexe is set to "0" in the initial routine executed when the ignition is changed to the on state.

When the value of the specific abnormality flag Xsf is "1", the CPU determines "Yes" in step 730, proceeds to step 740, and maintains the ignition in the on state. After that, the CPU proceeds to step 795 and temporarily ends this routine.

End Determination Routine

Figure 8:
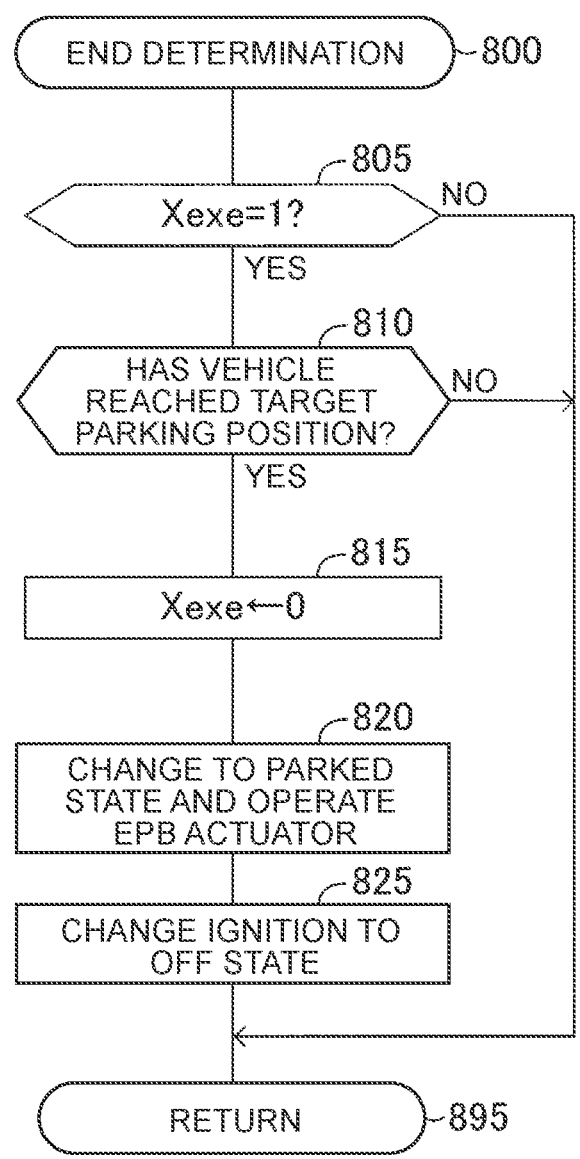
FIG. 8 is a flowchart showing an end determination routine executed by the CPU of the parking ECU.

The CPU executes an end determination routine shown by the flowchart in FIG. 8 every time a predetermined time elapses.

Therefore, at a predetermined timing, the CPU starts the process from step 800 in FIG. 8, proceeds to step 805, and determines whether the value of the execution flag Xexe is "1".

When the value of the execution flag Xexe is "0", the CPU determines "No" in step 805, proceeds to step 895, and temporarily ends this routine.

When the value of the execution flag Xexe is "1", the CPU determines "Yes" in step 805, proceeds to step 810, and determines whether the vehicle VA has reached the target parking position.

When the vehicle VA has not reached the target parking position, the CPU determines "No" in step 810, proceeds to step 895, and temporarily ends this routine.

When the vehicle VA has reached the target parking position, the CPU determines "Yes" in step 810 and executes steps 815 to 825 in order.

Step 815: The CPU sets the value of the execution flag Xexe to "0".

Step 820: The CPU changes the state of the power transmission device 34b to the parked state and operates the EPB actuator 56.

Step 825: The CPU changes the ignition to the off state.

After that, the CPU proceeds to step 895 and temporarily ends this routine.

Specific Abnormality End Determination Routine

Figure 9:
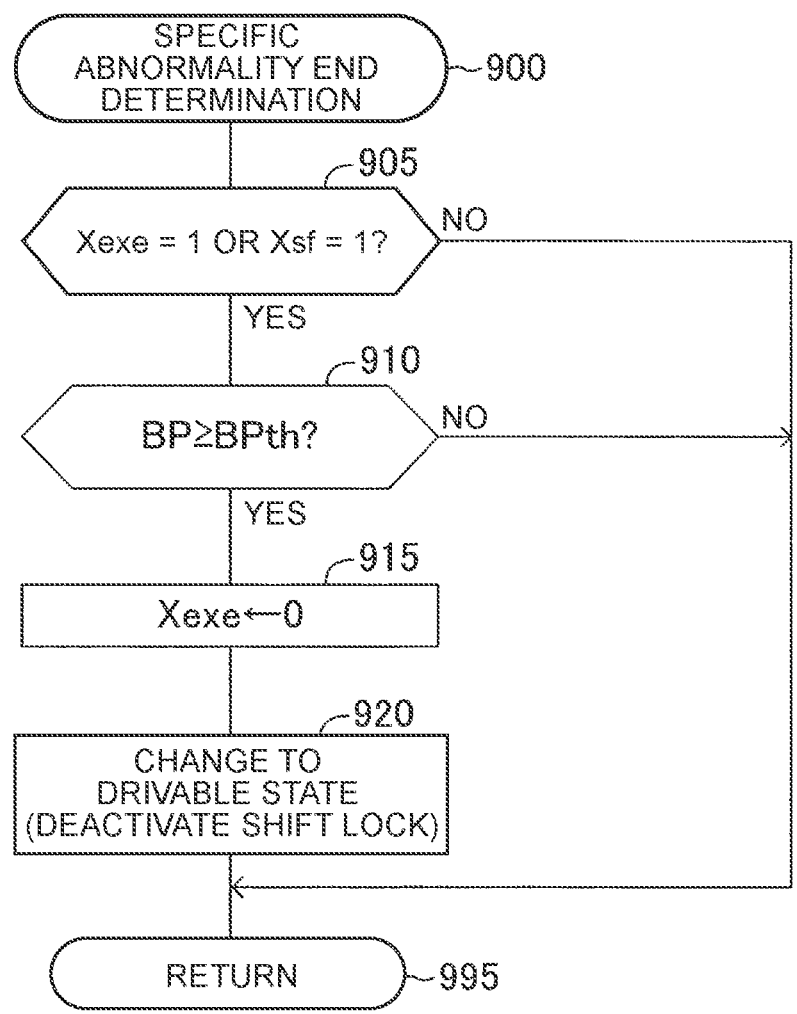
FIG. 9 is a flowchart showing a specific abnormality end determination routine executed by the CPU of the parking ECU.

The CPU executes a specific abnormality end determination routine shown by the flowchart in FIG. 9 every time a predetermined time elapses.

Therefore, at a predetermined timing, the CPU starts the process from step 900 in FIG. 9, proceeds to step 905, and determines whether the value of the execution flag Xexe is "1" and the value of the specific abnormality flag Xsf is "1".

When the value of at least one of the execution flag Xexe and the specific abnormality flag Xsf is "0", the CPU determines "No" in step 905, proceeds to step 995, and temporarily ends this routine.

When the value of the execution flag Xexe is "1" and the value of the specific abnormality flag Xsf is "1", the CPU determines "Yes" in step 905 and proceeds to step 910.

In step 910, the CPU determines whether the brake pedal operation amount BP is equal to or greater than a predetermined threshold operation amount BPth.

When the brake pedal operation amount BP is less than the threshold operation amount BPth, the CPU determines that the brake pedal 52a is not operated. In this case, the CPU determines "No" in step 910, proceeds to step 995, and temporarily ends this routine.

When the brake pedal operation amount BP is equal to or greater than the threshold operation amount BPth, the CPU determines that the brake pedal 52a is operated. In this case, the CPU determines "Yes" in step 910, and executes step 915 and step 920 in order.

Step 915: The CPU sets the value of the execution flag Xexe to "0".

Step 920: The CPU changes the state of the vehicle VA to a drivable state. The drivable state is a state in which the vehicle VA can travel in response to a driving operation by the driver seated in a driver's seat. For example, a shift lock is activated such that the shift lever 42a cannot be operated when the shift lever 42a is positioned in "P", but the CPU deactivates the shift lock.

After that, the CPU proceeds to step 995 and temporarily ends this routine.

The present disclosure is not limited to the above embodiment, and various modifications can be adopted within the scope of the present disclosure.

First Modification

In the above embodiment, the shift ECU 40 controls the shift switching mechanism 44a and the parking lock mechanism 44b via the SBW actuator 44. However, in the first modification, the drive ECU 30 may control the shift switching mechanism 44a via the SBW actuator 44, and the shift ECU 40 may control the parking lock mechanism 44b via the SBW actuator 44.

Second Modification

In the above embodiment, the parking ECU 20 displays the general abnormality screen 290 on the mobile terminal 23 when the general abnormality occurs. However, the parking ECU 20 may not display the general abnormality screen 290 on the mobile terminal 23 when the general abnormality occurs.

Third Modification

An operation that causes the state of the vehicle VA to transition to the drivable state when the specific abnormality has occurred during the execution of the automatic parking control is not limited to the operation of the brake pedal 52a (see step 910). This operation may be any operation performed when the user outside the vehicle gets on the vehicle VA. For example, this operation may be an operation of wearing a seatbelt (not shown) of the driver's seat.

Fourth Modification

The vehicle control device 10 can be mounted on a vehicle such as a hybrid electric vehicle (HEV), a plug-in hybrid electric vehicle (PHEV), a fuel cell electric vehicle (FCEV), and a battery electric vehicle (BEV).

What is claimed is:

1. A vehicle control device comprising circuitry configured to:
communicate with a mobile terminal operated by a user outside a vehicle;
execute automatic parking control for causing the vehicle to travel to a predetermined target parking position with an ignition being on state and parking the vehicle in the target parking position in response to an operation signal transmitted by the mobile terminal when the user performs a predetermined operation on the mobile terminal;
determine whether an abnormality occurs in the vehicle during execution of the automatic parking control;
in response determining that the abnormality occurs in the vehicle during execution of the automatic parking control, determine whether the abnormality is a first abnormality or a second abnormality, wherein when the abnormality is the first abnormality the ignition is able to be changed to the on state again after the ignition is temporarily changed to an off state, and when the abnormality is the second abnormality the ignition being not able to be changed to the on state again after the ignition is temporarily changed to the off state;
execute first abnormality vehicle stop control in response to determining that the
abnormality is the first abnormality, decelerating the vehicle to stop the vehicle and changing the ignition of the vehicle from the on state to the off state when the vehicle is stopped; and
execute second abnormality vehicle stop control in response to determining that the abnormality is the second abnormality, decelerating the vehicle to stop the vehicle and prohibiting the ignition from being changed to the off state when the vehicle is stopped.

2. The vehicle control device according to claim 1, wherein the circuitry is configured to detect an abnormality related to a drive device that applies driving force to the vehicle and a lever position indicating a position of a shift lever set by a driver seated in a driver's seat of the vehicle, and preset, as the second abnormality, an abnormality related to a shift-by-wire mechanism that changes a state of a power transmission device that transmits the driving force generated by the drive device to a drive wheel of the vehicle to a state corresponding to the lever position.

3. The vehicle control device according to claim 2, wherein the circuitry is configured to:
   cause the shift-by-wire mechanism to change the state of the power transmission device to a parked state in which the driving force is not transmitted to the drive wheel and the drive wheel is stopped, when the vehicle reaches the target parking position, in the automatic parking control;
   change the ignition to the on state when a predetermined on condition including a condition that the state of the power transmission device is in the parked state is satisfied, and prohibit the ignition from being changed to the on state when the on condition is not satisfied, in a case where the ignition is in the off state, and an ignition switch provided in a vehicle cabin of the vehicle is operated; and
   preset, as the abnormality related to the shift-by-wire mechanism, an abnormality in which the shift-by-wire mechanism is not able to change the state of the power transmission device to the parked state.

4. The vehicle control device according to claim 3, wherein:
   the on condition further includes a condition that an electric parking brake is operated; and
   the circuitry is configured to
   further operate the electric parking brake when the vehicle reaches the target parking position in the automatic parking control, and
   preset, as the second abnormality, an abnormality in which the electric parking brake is not able to be operated.

5. The vehicle control device according to claim 1, wherein the circuitry is configured to display a notification screen on the mobile terminal for notifying the user that the second abnormality has occurred when the second abnormality occurs during the execution of the automatic parking control.

\* \* \* \* \*